April 2, 1963 P. W. TRUMAN 3,083,570
AUTOMATICALLY SUPERVISED FLOW METER APPARATUS
Filed March 19, 1958 3 Sheets-Sheet 1
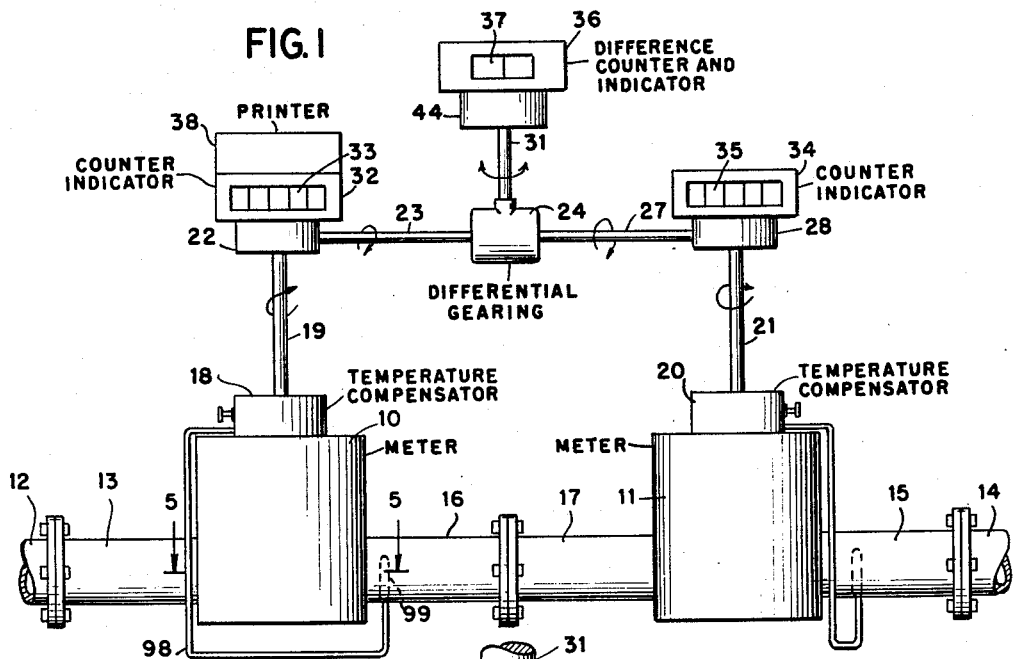
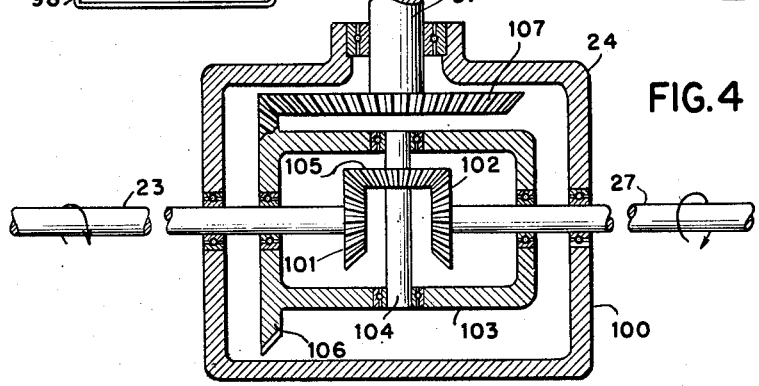
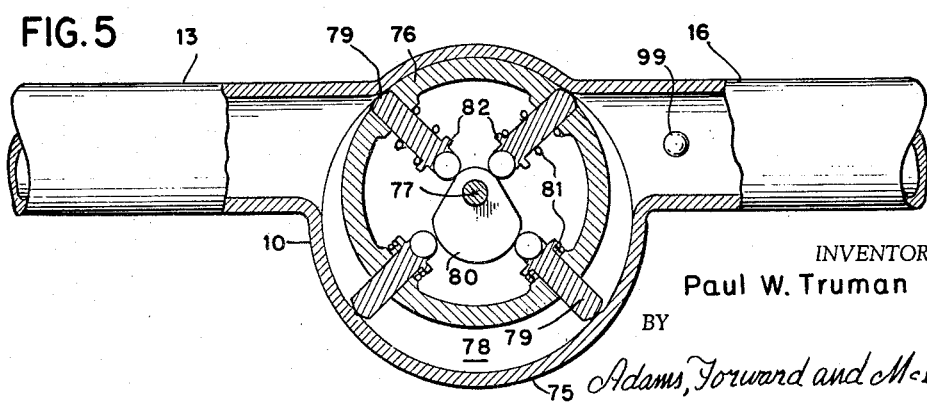
INVENTOR.
Paul W. Truman
BY
Adams, Forward and McLean
ATTORNEYS

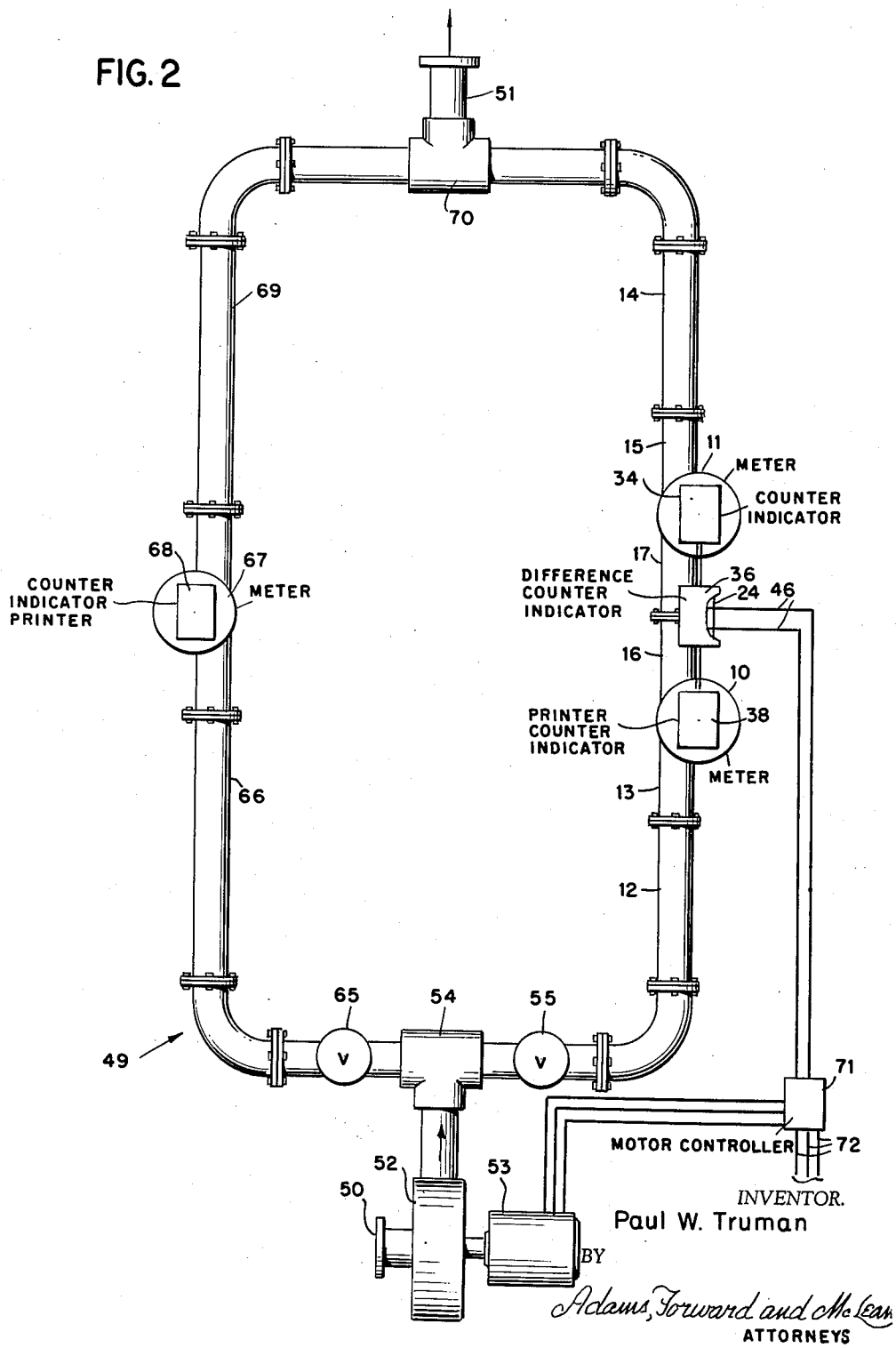

April 2, 1963 P. W. TRUMAN 3,083,570
AUTOMATICALLY SUPERVISED FLOW METER APPARATUS
Filed March 19, 1958 3 Sheets-Sheet 3
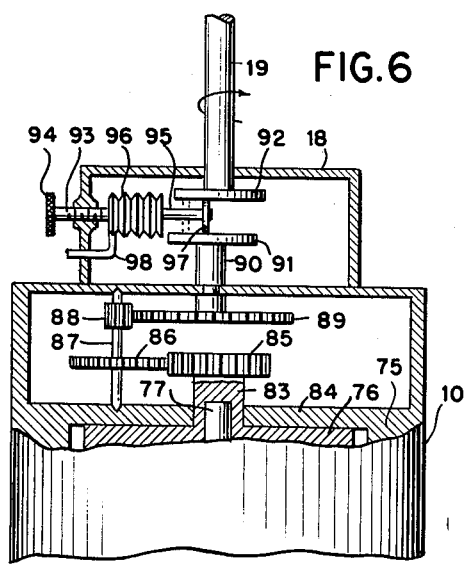
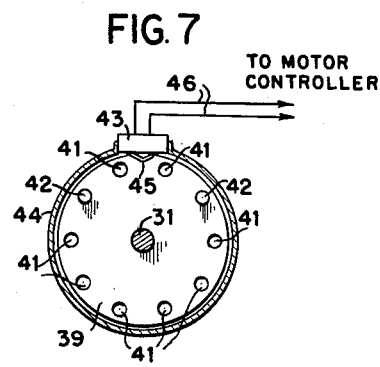
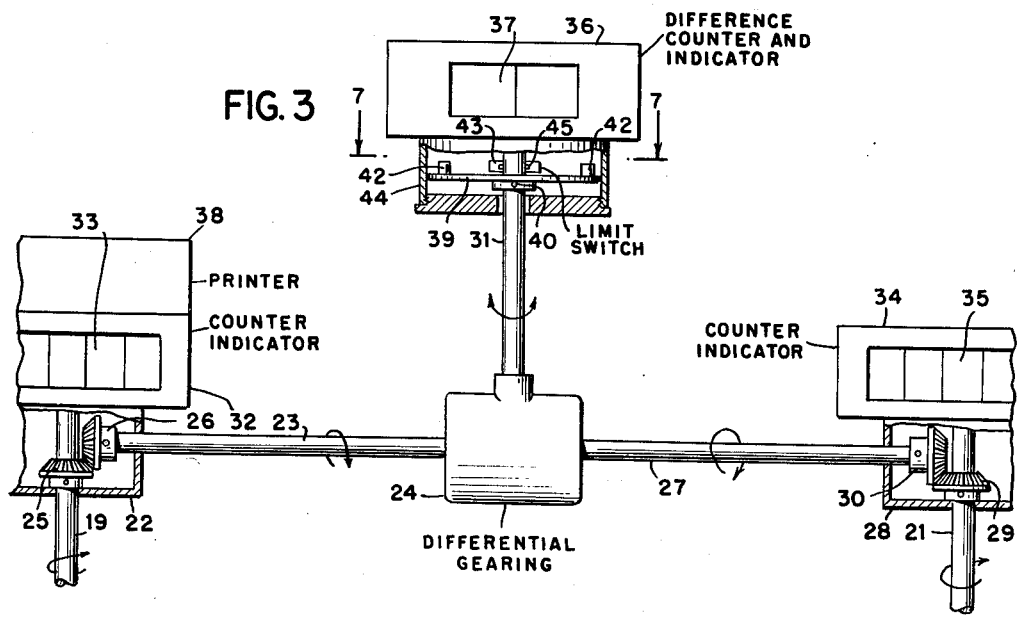
INVENTOR.
Paul W. Truman
BY
*Adams, Forward and McLean*
ATTORNEYS

United States Patent Office 3,083,570
Patented Apr. 2, 1963

3,083,570
AUTOMATICALLY SUPERVISED FLOW METER APPARATUS
Paul W. Truman, Tulsa, Okla., assignor, by mesne assignments, to Sinclair Research, Inc., New York, N.Y., a corporation of Delaware
Filed Mar. 19, 1958, Ser. No. 722,504
2 Claims. (Cl. 73—195)

My invention relates to measuring fluid flow and in particular provides automatic supervision of a flow meter.

In transferring crude oil to pipelines from lease in which it is produced it is customary to provide stock tanks for the lease production from which it is periodically delivered to the pipeline. The quantity of oil thus delivered is determined by dip stick in order to assure accurate measurement of the delivery. The dip stick method of measurement is, however, subject to some inaccuracy. Each operator will read the measurement somewhat differently than the next and from one time to the next. Normally the best accuracy that can be expected is within one-quarter (¼) inch. In a large stock tank this limit on accurate measurement can result in serious accumulated errors over a period of time. While highly accurate positive displacement meters are available which could be utilized to drive indicators and printing mechanisms, thus obviating the need for stock tanks at the delivery point and reducing the error of measurement, such meters normally must be temperature compensated because over the period of time of delivery variations in temperature of the oil passing through the meter will otherwise prevent measurement of volume delivered based on a standard temperature. Even the best temperature compensating devices available are subject to wear and can malfunction quite suddenly to cause a serious error in the indicated volume delivered. As a result it has not been feasible heretofore to substitute a positive displacement meter for automatic custody transfer from the lease to the pipeline.

It is a principal object of my invention to provide an automatically supervised flow meter arrangement in which malfunctioning, for example of the temperature compensator, is immediately detected in a manner permitting operation of an automatic shut-down device and also permitting operation of alarm circuits or the like. Thus it is a primary object of my invention to provide a metering arrangement which will permit automatic custody transfer and which will eliminate the need of stock tanks on the lease as well as provide the advantage of higher accuracy incident to the employment of mechanical metering.

Fundamentally, automatic supervision of a flow meter, such as a temperature compensated, positive displacement flow meter, is accomplished in accordance with my invention by connecting two identical flow meters in series in the transfer line and arranging their indicator shafts to drive a third indicator shaft differentially, i.e., as the indicator shafts of the flow meters are driven by flow of fluid through the transfer line the third, differential indicator shaft is driven in one direction if the indicator shaft of one meter turns faster than the indicator shaft of the other and the differential indicator shaft is driven in the other direction if the indicator shaft of the one meter is driven slower than the indicator shaft of the other. The differential indicator shaft drives a wheel, crank, cam or similar device which actuates a limit switch when the differential indicator shaft has been driven a pre-determined distance in either direction by a difference in the rates at which the meter shafts are driven.

The limit switch can be utilized to operate the motor control circuit for the pump driving the oil through the transfer line and can also be utilized to operate an alarm circuit notifying an attendant who may be at some remote location. It is, of course, feasible to provide a by-pass line containing a third meter or an identical arrangement of a pair of meters which can be manually cut-in while the cause of the meter error is located and corrected. Alternatively, the limit switch operation can be employed to operate power driven valves shutting down flow through the transfer line and opening flow through a by-passing transfer line as well as providing alarm indication of the error.

For a more complete understanding of the practical application of the principles of my invention reference is made to the appended drawings in which:

FIGURE 1 is an elevation of the essential portions of an automatic custody transfer unit including automatic meter supervision in accordance with my invention;

FIGURE 2 is a schematic plan view indicating the general arrangement of all the parts of the automatic custody transfer unit of which the apparatus shown in FIGURE 1 is a part;

FIGURE 3 is an enlarged, partially sectioned elevation of a portion of the apparatus shown in FIGURE 1;

FIGURE 4 is a vertical section through a portion of the apparatus shown in FIGURE 1;

FIGURE 5 is a cross-section taken at line 5—5 in FIGURE 1;

FIGURE 6 is a vertical section of another portion of the apparatus shown in FIGURE 1; and FIGURE 7 is a cross-section taken at line 7—7 in FIGURE 3.

Referring more particularly to FIGURE 1, the automatically supervised flow meter arrangement of my invention basically includes a first meter 10 and a second meter 11 connected in series between an inlet transfer line connection 12 which is connected to the inlet 13 of meter 10 and an outlet transfer line 14 which is connected to the outlet 15 of meter 11. The outlet 16 of meter 10 is directly connected to the inlet 17 of meter 11 to complete the series connection of meters 10 and 11. Through a temperature compensator 18 meter 10 drives an output (indicator drive) shaft 19, and through a temperature compensator 20 meter 11 drives an output (indicator drive) shaft 21. The internal gearing of meters 10 and 11 is such that output shafts 19 and 21 are counter-rotating when fluids are passed from the inlet transfer line 12 through the series meter connection to outlet transfer line 14.

Referring also to FIGURE 3 as well as FIGURE 1, output shaft 19 of meter 10 through a right angle drive 22 drives an input shaft 23 to a differential gearing 24 by means of a bevel gear 25 affixed to shaft 19 which meshes with a bevel gear 26 affixed to shaft 23. Similarly output shaft 21 of meter 11 drives input shaft 27 of differential gearing 24 through a right angle drive 28 by means of a bevel gear 29 affixed to shaft 21 which meshes with a bevel gear 30 affixed to shaft 27. Thus fluid flow through the series connected meters 10 and 11 drives differential inputs shafts 23 and 27 counter to one another. Differential gearing 24 is arranged such that its output (indicator drive) shaft 31 is driven in one direction by the rotation of shaft 23 and in the reverse direction by rotation of shaft 27 such that if shafts 23 and 27 are counter-rotating at exactly the same speeds shaft 31 does not turn.

Three indicator devices are provided which also perform the function of counting. One, counter indicator 32, is driven by shaft 19 of meter 10 and on a conventional wheel indicator 33 indicates the total revolutions of shaft 19 calibrated in barrels of oil. Similarly a counter indicator 34 is driven by shaft 21 of meter 11 to indicate the total revolutions of shaft 21 calibrated in barrels of oil on a conventional wheel indicator 35. The third counter indicator is a difference counter indicator 36 driven by output shaft 31 of differential gearing 24 and on conventional wheel indicator 37 indicates the revolutions of shaft 31 calibrated in barrels of oil positively for one direction of rotation of shaft 31 and negatively for the other. A printer 38 is mounted on counter indicator 32 and in a conventional manner is hand operable at any time to print on a ticket the total barrels indication registering on wheel indicator 33.

Output shaft 31 of differential gearing 24 also drives a peg wheel 39 which is shown in FIGURES 3 and 7. Peg wheel 39 is affixed to shaft 31 by means of a set screw 40 threadedly engaged in the hub of wheel 39 and bearing against shaft 31. Peg wheel 39 at equal arcuate intervals about and adjacent to its rim is provided with ten tapped bores 41. Two pegs 42 are threadedly engaged in two such tapped bores 41 and project above peg wheel 39 which in the drawings is shown lying in a horizontal plane. A normally closed micro switch 43 is mounted in the exterior casing 44 enclosing peg wheel 39 with its actuating element 45 normally positioned (when indicator 36 registers zero difference) medially between pegs 42 and projecting into the arcuate path of pegs 42 as these are rotated by shaft 31. Thus if shaft 31 is sufficiently rotated in one direction a peg 42 will trip actuating element 45 of micro switch 43 to open an external circuit connected to switch 43 by lines 46. Thus switch 43 in effect functions as a limit switch responsive to a difference in the rates of rotation of shafts 19 and 21.

Although each of the various parts described above is by itself essentially conventional, a brief description of the operation of certain of these parts will assist in the understanding of the operation of my invention. Also a brief description of the entire automatic custody transfer unit incorporating the previously described apparatus will be helpful in understanding the function of my invention.

Thus referring to FIGURE 2, the flow meter arrangement described is incorporated in and is the heart of an automatic custody transfer unit 49 suitably mounted on skids to permit its installation and removal at various locations. The portable automatic custody transfer unit 49 insofar as necessary to describe it with reference to the operation of the automatic meter supervision provided by my invention basically includes a suction connection 50 for connection to the lease surge tank and discharge connection 51 for connection to the pipeline to which the lease production is to be delivered.

In unit 49 suction connection 50 is connected to the inlet side of a pump 52 driven by an electric motor 53. The outlet of pump 52 is connected to a T-connection 54 which to one side is connected through a valve 55 to transfer inlet line 12 leading to meter 10 and which to the other side is connected through a valve 65 to a by-pass transfer line 66 leading to a meter 67 identical to meter 10 and like meter 10 provided with a counter, indicator and printer arrangement 68. The outlet side of meter 67 is connected through by-pass transfer line 69 to one side of a T-connection 70 leading to discharge connection 51. Transfer outlet line 14 is similarly connected to the other side of T-connection 70.

The lead lines 46 connect limit switch 43 to a motor controller 71 for motor 53, which in addition to providing the conventional start and stop push buttons for connecting and disconnecting motor 53 to power lines 72 is also provided with a connection for the start relay locking circuit through lines 46 to limit switch 43 which, since in normal position it is closed, permits the start relay to lock when the start button is actuated.

Thus it will be apparent that automatic custody transfer unit 49 provides a power source for pumping oil produced on the lease from suction connection 50 to discharge connection 51 through the series arrangements of meters 10 and 11 when valve 55 is open and through alternate meter 67 when valve 65 is open. It will also be apparent that engagement of a peg 42 with actuating element 45 of limit switch 43 will function to inactivate motor 53 and shut down operation.

Referring more particularly to FIGURE 5, which shows a cross-section through meter 10 it will be observed that meter 10 is a conventional, positive displacement, liquid flow meter having a cylindrical casing 75, in the cylindrical side wall of which inlet line 13 and outlet line 16 are directly connected. Meter 10 is provided with an inner cylinder 76 slidably fitted at its ends within the ends of casing 75 and which on one side between inlet line 13 and outlet line 16 slidably contacts the inner wall of casing 75. Inner cylinder 76 is mounted coaxially with, for rotation on, a shaft 77 which is eccentrically mounted in casing 75 such that a passage 78 is provided between inlet 13 and outlet 16 between casing 75 and cylinder 76.

At 90° intervals about inner cylinder 76 there are mounted four radially extending vanes 79 which extend through the wall of cylinder 76 and at their inner ends bear against cam 80 affixed to shaft 77 which is affixed at its lower end to casing 75. Cam 80 is shaped to permit vanes 79 to retract radially, fully into cylinder 76 as they are rotated by cylinder 76 past that side of cylinder 76 which contacts the inner wall of casing 75 and are urged radially outward by cam 80 as they are carried through passage 78 to contact the inner wall of casing 75. Vanes 79 are spring biased inwardly, as indicated schematically by compressed helical coil springs 81 mounted about the inner extensions of vanes 79. Springs 81 abut at their inner ends against an enlarged flange 82 affixed to the inner end of each vane 79 and abut at their outer ends against the inner wall of cylinder 76 to urge vanes 79 inwardly into contact with cam 80.

Thus fluid passing from inlet line 13 to outlet line 16 is entrapped momentarily within a chamber in passage 78 between a pair of adjacent vanes 79, which chamber therefore has fixed dimensions. When the fluid is non-compressible its flow through meter 10 thus causes rotation of inner cylinder 76 at a rate which is a direct function of the flow rate of the fluid.

FIGURE 6 shows a vertical section through the upper portion of meter 10 and indicates schematically the gearing arrangement and temperature compensator 18 connections by which rotation of cylinder 76 drives output shaft 19 of meter 10.

Briefly, the upper end of cylinder 76 is closed and at its center has an upwardly extending hub 83 which at its lower end is axially bored slidably to receive the upper end of post 77. In the upper end of casing 75 there is an inner transverse partition 84 which is apertured to receive hub 83 and which on its underside slidingly receives the upper end of inner cylinder 76. At its upper end above partition 84, hub 83 carries a spur gear 85 affixed to it which drives a second spur gear 86 mounted on a spindle 87 affixed at its ends in bearings located in the top of casing 75 and in partition 84. Above gear 86 spindle 87 carries affixed to it a pinion 88 which meshes with a large diameter spur gear 89 affixed to the lower end of a stub shaft 90 mounted for rotation in the upper end of casing 75 extending upwardly into temperature compensator 18 where it terminates in a flat disk 91.

Spaced above disk 91 is a second flat disk 92 carried on the lower end of output shaft 19 where this extends into temperature compensator 18. Both stub shaft 90 and output shaft 19 are vertically positioned, but eccentrically one to the other.

In the side wall of temperature compensator 18 there is threadedly mounted a short horizontal machine screw 93, which on its exterior end is provided with a knurled head 94. Interiorly screw 93 is connected to a horizontal shaft 95 aligned with screw 93 by means of a short bellows 96. The end of shaft 95 remote from bellows 96 carries rotatably mounted thereon a small wheel 97 which frictionally contacts the under surface of disk 92 and the upper surface of disk 91 along parallel radii in such surfaces.

Thus expansion and contraction of bellows 96 or rotation of bolt 93 will cause movement of wheel 97 inwardly toward or outwardly from the centers of rotations of disks 91 and 92 between, for example, the solid line and broken line positions shown in FIGURE 6. Such movement, as is well known, varies the relative speeds of output shaft 19 and stub shaft 90 such that shaft 19, for a given angular velocity of shaft 90, will rotate slower in the solid line position of wheel 97 closer to the center of disk 92 than in the broken line position more remote from such center. Bellows 96 is internally connected by means of a capillary 98 (see also FIGURE 1) to a bulb 99 (see also FIGURE 5) located on the outlet side 16 of meter 10. Bulb 99, capillary 98 and bellows 96 contain a liquid having a relatively high thermal coefficient of expansion. Thus when the temperature of oil or other fluid passing through meter 10 increases, expansion of bellows 96 results, causing output shaft 19 to decrease its speed relative to shaft 90, correcting the rate of rotation of shaft 19 relative to the rate of rotation of cylinder 76 to compensate for the decrease in density of the fluid pumped.

Meter 11 and temperature compensator 20 are exactly identical in size and arrangement to meter 10 and compensator 18 with the single exception that an extra spur identical to spur 86 is provided in the gear train between the corresponding spurs 85 and 86 in meter 11 to cause shaft 21 to rotate counter to shaft 19.

Differential gearing 24 is entirely conventional and simply includes, referring to FIGURE 4, a fixed casing 100 into opposite sides of which extend axially aligned input shafts 23 and 27. These are journaled for rotation in casing 100 and at their inner ends confronting each other respectively carry bevel gears 101 and 102. An inner casing 103 is journaled for rotation about shafts 23 and 27 and houses bevel gears 101 and 102. Centrally inner casing 103 is spanned by a shaft 104 which extends perpendicularly to the line of shafts 23 and 27 between bevel gears 101 and 102 and which is journaled at its ends for rotation in inner casing 103. Shaft 104 carries affixed to it a bevel gear 105 which meshes with bevel gears 101 and 102.

Since shafts 23 and 27 are counter-rotating, if they are counter-rotating at exactly the same speed, inner casing 103 remains stationary. However, a difference in the speeds of rotation of shafts 23 and 27 by reason of the reaction of gears 101, 102 and 105 will cause inner casing 103 to be rotated at a rate corresponding to the difference in angular rates of rotations of shafts 23 and 27. Casing 103 carries at one end a radial flange extension which is provided with gear teeth forming a bevel gear 106. Output shaft 31 from differential gearing 24 extends into casing 100 through suitable journals vertical from above casing 100 and at its lower end within casing 100 and above casing 103 carries a bevel gear 107 which meshes with gear 106. Thus rotation of inner casing 103 caused by a difference in the rates of rotation of differential gearing input shafts 23 and 27 produces a corresponding rotation of output shaft 31.

In operation the automatic custody transfer unit 49 schematically shown in FIGURE 2 is connected to the surge tank from a group of producing wells on a lease through suction line 50 and is connected through discharge line 51 to the pipeline for delivering the production of the wells to the pipeline, both valves 55 and 65 being closed at the time and motor 53 inoperative. Prior to installation, of course, meters 10, 11 and 67 have been calibrated by conventional techniques and temperature compensators 18 and 20 have been properly adjusted by means of machine screws 93.

A print is then made on the delivery card by printer 38 of the total indicated on counter indicator 32 which ordinarily reads out to hundredths of barrel. Difference counter and indicator is set to read a zero difference and pegs 42 are inserted in appropriate tapped bores 41 of peg wheel 39 sufficiently removed equal distances from actuating element 45 of limit switch 43 to allow a total error considered within the tolerance permitted for the delivery.

Valve 55 is then opened and motor controller 71 is actuated to start motor 53 and commence operation pumping oil from suction line 50 to discharge line 51 through meters 10 and 11. Operation continues and as long as meters 10 and 11 do not malfunction output shafts 19 and 21 should rotate at exactly the same speeds. Accordingly negligible rotation of shaft 31 occurs and delivery continues.

When the delivery is completed motor controller 71 is operated to shut down motor 53, valve 55 is then closed and a print is taken on the delivery card of the then indicated total barrels appearing on counter indicator 32 by means of operation of printer 38. The delivered amount (difference in total barrels between the initial print on the delivery ticket and the final print) is thereafter corrected for BS and W in the conventional manner.

In ordinary experience the preceding description of operation will be repeated time after time without malfunction causing a difference in readings on counter indicators 33 and 35. Ordinarily some small drift will occur but insufficiently to actuate limit switch 43. Hence, as each delivery is commenced in order to avoid building up an accumulated error which would actuate switch 43 it is desirable to reset peg wheel 39 and indicator 36 as an initial step of each operation.

If malfunction of either meter 10 or meter 11 occurs, typically by sudden failure of temperature compensator 18 or 20, the relative rates of rotation of output shafts 19 and 21 will change sharply causing input shafts 23 and 27 to differential gearing 24 to rotate at different rates thereby causing output shaft 31 of differential gearing 24 to rotate in one direction or the other depending upon which meter shaft is rotating faster than the other. Such rotation rapidly brings one peg 42 or the other into an engaging contact with actuating element 45 of limit switch 43 breaking the circuit through lines 46 in the holding circuit of the start solenoid of motor controller 71 and shutting down motor 53. Desirably additional contacts are provided on the solenoid which when it is released activate an alarm circuit to notify an attendant or remotely located station of the meter malfunction.

After such a malfunction the attendant on arrival at automatic custody transfer unit 49 closes valve 55, takes a print on printer 38 and starts a new delivery ticket by taking a print on counter indicator printer 68 driven by meter 67. Valve 65 is then opened and motor controller 71 actuated to start motor 53 and recommence operation through meter 67. Ordinarily before this can be done lines 46 will have to be short-circuited; at least until the peg 42 which shut down the transfer unit is removed from its contact with actuating element 45 by re-setting pegwheel 39 to zero position.

Since the automatic supervision of meters 10 and 11 does not indicate which of these was responsible for the shut down, both must be replaced by pre-calibrated meters which are installed as soon as possible. Motor 53 is then turned off, valve 65 is then closed, and a print is taken on printer 68 to close delivery through meter 67. A delivery ticket print is then taken at printer 38 to recommence operation through the replaced meters 10 and 11 as indicated above for commencing normal operation. Care must be taken that lines 46, which were shorted or otherwise disconnected from the motor control circuit during the replacement, are reconnected to provide proper supervision of custody transfer unit 49.

From the preceding description it will be apparent that many variations and arrangements can be provided utilizing the automatic supervision of flow meters in accordance with my invention. As a practical matter peg wheel 39, although shown separately in the illustrated case for the sake of simplicity, will ordinarily be the second indicator wheel of difference counter and indicator 36, such that although the indicator portion 37 indicates hundredths barrels on one wheel the second wheel, which indicates in barrels, is the peg wheel. This is desirable to provide a reasonable tolerance for the normally anticipated variations between the measurements made by meter 10 and those made by meter 11. Where the indicator wheels are those in which the second wheel rotates a tenth of a turn after completion of each turn of the first indicator wheel it should be noted that when the wheels are set to read zero the least rotation in a negative direction will abruptly cause the second wheel to rotate a tenth of a turn. Hence, if a two barrel tolerance is desired, the location of peg 42 on such a second wheel to limit rotation in a negative direction would correspond to the seven numeral position, whereas in a positive direction the peg would be located at the two position.

I claim:

1. An automatically supervised flow meter apparatus for connection in a fluid conduit to measure the flow therethrough, said flow meter apparatus including a first fluid flow meter and a second fluid flow meter, each said meter including a fluid inlet connection, a fluid outlet connection and an output shaft rotatably driven by fluid flow through each said meter, the outlet connection of the first said meter being connected to the inlet connection of the second said meter, said first and second flow meters being connected in said conduit for passage of the fluids in said conduit through said first and second meters in series, a differential gearing including a first drive member, a second drive member and an output member driven differentially by said first and second drive members, said first drive member being connected to the output shaft of said first meter to be driven thereby and said second drive member being connected to the output shaft of said second meter to be driven thereby, means connected in said conduit for controlling the passage of fluid therethrough and through said meters, a control device connected to said means actuable to operate said means to stop passage of fluid through said conduit and said meters, and a switch having an actuating element extending therefrom and a control element for actuating said control device mounted to be operated by said output member of said differential connection upon a predetermined movement of said output member of said differential connection, said control element including a wheel having two pegs thereon positioned with said actuating element located in the path of movement of said pegs as said control element is driven by said output member.

2. An automatically supervised flow meter apparatus for connection in a fluid conduit to measure the flow therethrough, said flow meter apparatus including a first fluid flow meter and a second fluid flow meter, each said meter including a fluid inlet connection, a fluid outlet connection and an output member driven by fluid flow through each said meter, the outlet connection of the first said meter being connected to the inlet connection of the second said meter, said first and second flow meters being connected in said conduit for passage of the fluids in said conduit through said first and second meters in series, a differential connection including a first drive member, a second drive member and an output member driven differentially by said first and second drive members, said first drive member being connected to the output member of said first meter to be driven thereby and said second drive member being connected to the output member of said second meter to be driven thereby, means connected in said conduit for controlling the passage of fluid therethrough and through said meters, a control device connected to said means actuable to operate said means to stop passage of fluid through said conduit and said meters, and a control element for actuating said control device mounted to be operated by said output member of said differential connection upon a predetermined movement of said output member of said differential connection, a valve connected in said conduit between the fluid inlet connection of the first fluid flow meter and said means, a by-pass conduit having a fluid inlet connection connected to said conduit between said means and said valve and a fluid outlet connection connected to said conduit below the fluid outlet connection of the second fluid flow meter, a third fluid flow meter including a fluid inlet connection, a fluid outlet connection and an output member driven by fluid flow through said meter, said third meter being connected in said by-pass conduit, and a second valve connected in said by-pass conduit between the fluid inlet connection of the third fluid flow meter and said means.

References Cited in the file of this patent
UNITED STATES PATENTS

| | | |
|---|---|---|
| 578,569 | Knox | Mar. 9, 1897 |
| 1,876,512 | Pfening et al. | Sept. 6, 1932 |
| 1,970,894 | Maag | Aug. 21, 1934 |
| 2,217,638 | Luhrs | Oct. 8, 1940 |
| 2,262,031 | Meyer | Nov. 11, 1941 |
| 2,290,408 | Crites | July 21, 1942 |
| 2,600,284 | Tranter | June 10, 1952 |
| 2,635,454 | Ford | Apr. 21, 1953 |
| 2,736,201 | Ohlsen et al. | Feb. 28, 1956 |
| 2,750,581 | Darian | June 12, 1956 |
| 2,782,902 | Sloane | Feb. 26, 1957 |

FOREIGN PATENTS

| | | |
|---|---|---|
| 696,236 | Great Britain | Aug. 26, 1953 |
| 1,045,858 | France | Dec. 1, 1953 |

OTHER REFERENCES

Publication: Oil and Gas Journal, June 11, 1956, pages 110–114.

Catalog No. 46, The Ford Meter Box Co., Inc., Wabash, Ind. Copy in Division 36, Class 73–3. Pages 29 and 42 only required. Received October 3, 1946.